(12) United States Patent
Mundarath et al.

(10) Patent No.: US 9,098,121 B2
(45) Date of Patent: Aug. 4, 2015

(54) VECTOR COMPARATOR SYSTEM FOR FINDING A PEAK NUMBER

(71) Applicants: Jayakrishnan C. Mundarath, Austin, TX (US); Leo G. Dehner, Austin, TX (US); Eric J. Jackowski, Chicago, IL (US)

(72) Inventors: Jayakrishnan C. Mundarath, Austin, TX (US); Leo G. Dehner, Austin, TX (US); Eric J. Jackowski, Chicago, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 335 days.

(21) Appl. No.: 13/746,891

(22) Filed: Jan. 22, 2013

(65) Prior Publication Data
US 2014/0207836 A1    Jul. 24, 2014

(51) Int. Cl.
*G06F 7/00* (2006.01)
*G06F 7/02* (2006.01)

(52) U.S. Cl.
CPC .................................... *G06F 7/026* (2013.01)

(58) Field of Classification Search
CPC ....... G06F 9/30021; G06F 7/544; G06F 7/22; G06F 7/026; G06F 9/3001
USPC ........................................................ 708/207
See application file for complete search history.

(56) References Cited

U.S. PATENT DOCUMENTS

| 5,051,939 A * | 9/1991 | Nakamura ................... 708/207 |
| 6,470,440 B1 * | 10/2002 | Nguyen et al. ............... 708/207 |
| 7,552,155 B2 | 6/2009 | Huggett |
| 2012/0023308 A1 * | 1/2012 | Kumura et al. ................... 712/7 |

OTHER PUBLICATIONS

G. Miranker et al., A "Zero-Time" VLSI Sorter, IBM J. Res. Develop., vol. 27, No. 2, Mar. 1983.
F. Daneshgaran et al., Efficient parallel pipelinable VLSI architecture for finding the maximum binary number, IEEE Proc-Circuits Devices Syst., vol. 141, No. 6, Dec. 1994.

* cited by examiner

*Primary Examiner* — Tan V. Mai
(74) *Attorney, Agent, or Firm* — Terrile, Cannatti, Chambers & Holland, LLP; Michael Rocco Cannatti

(57) ABSTRACT

A comparator (231) for determining a peak number, representing a maximum or minimum of a set of numbers, includes a multi-element comparator (232) for comparing different pages of the set of numbers in a page comparison mode to output a candidate set of winning numbers, and for automatically switching to a leaf/tree search of the candidate set of winning numbers in an element comparison mode. Operating in parallel with the multi-element comparator (232), an index generation unit (233) processes flag/sign bits from the multi-element comparator in conjunction with state machine control logic (230) to keep track of the index/indices for the peak value. Upon completion of final stage, the index generation unit returns the absolute index (235) of the peak value.

22 Claims, 8 Drawing Sheets

VECTOR COMPARATOR SYSTEM FOR FINDING A PEAK NUMBER

BACKGROUND OF THE INVENTION

1. Field of the Invention

The present invention is directed in general to the field of information processing. In one aspect, the present invention relates a system for finding a maximum or minimum number in a set of numbers.

2. Description of the Related Art

Signal processing applications often require that a set of numbers be evaluated to find a peak number representing a maximum or minimum number from the set of numbers. For example, wideband digital communication transmitters which use crest factor reduction (CFR) algorithms to reduce the cost and improve efficiency of the power amplifiers by sequentially processing input signal samples to detect peaks in the signal envelope above a certain threshold, and then perform subtractive modification of a region surrounding each detected peak to suppress the peaks to below the threshold. In other applications, peak detection techniques may be used to identify localized waveform peaks (e.g. maximum or minimum values) when synchronizing signals. While existing solutions have been proposed for sorting and finding maximum/minimum numbers from a set of numbers, such solutions typically operate as sequential circuits that process one incoming data point at a time, or are otherwise confined to a fixed data size that is limited by a comparator unit width. In addition, existing approaches for evaluating a set of numbers to find a peak value can impose significant complexity and processing costs in terms of the required digital processing resources and clock cycles, thereby preventing real-time detection of maximum/minimum numbers.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
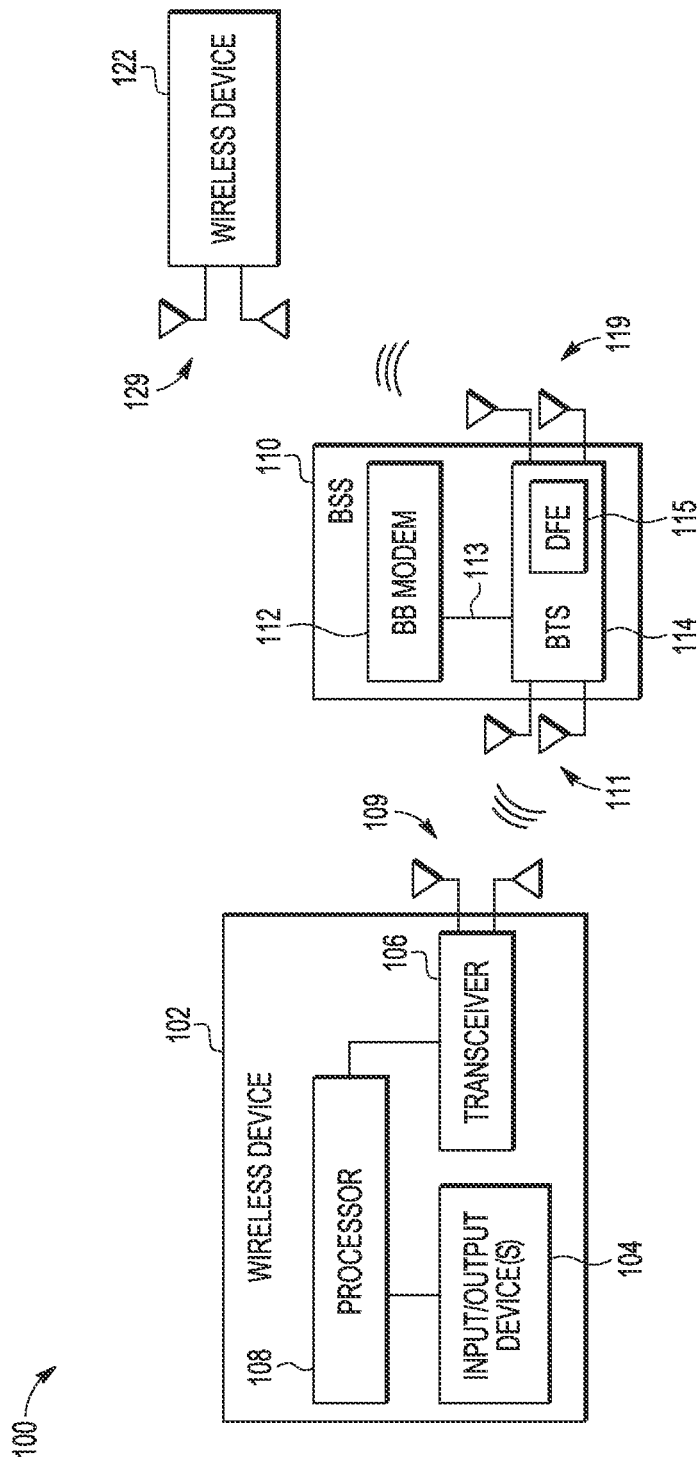
FIG. 1 is a simplified block diagram of a wireless communication system with a base station system deployed with a plurality of radio base station subsystems in accordance with selected embodiments of the present disclosure.

A vector comparator system, apparatus, and methodology are described for finding a peak value (e.g. maximum or minimum number) in an input data vector using parallel arrangement of a vector comparator unit (VCU) and index generation unit (IGU) controlled by a state machine which automatically detects and adapts operational modes based on the size of the input data vector. In operation, the vector comparator unit uses a combination of vector comparison and tree reductions to reduce the search set to find the max/min number, while the index generation unit operates in parallel to track information that enables the calculation of the final winning index. The vector comparator unit and index generator unit may be embodied in a single chip digital front end processor and programmed to operate in parallel to process data sizes that are larger than the vector comparator unit using page and element modes of operation, thereby providing a compact, efficient, and flexible arrangement for evaluating a programmable sized set of numbers. In selected embodiments, the vector comparator unit includes a multi-element vector comparator (e.g. having 64, 128, or 256 comparison elements) which receives first and second multiplexed inputs A, B, depending on the operational mode of the vector comparator system. The multi-element vector comparator generates first and second comparison outputs C, s which are supplied, respectively, to the first multiplexed input A and the index generation unit. In response to control signals defining a page operational mode, the vector comparator unit compares successive pages or subsets from an input data vector at the multi-element vector comparator to identify a search set of the comparison winners from all pages or subsets of the input data vector, while the index generation unit simultaneously processes the second comparison output s in a page/subset index register to track the winning page/subset for each element in the multi-element vector comparator output. Once all pages or subsets of the input data vector have been processed, the control signals define an element operational mode wherein the vector comparator unit uses a combination of vector and tree reductions to reduce the search set to find the max/min number, while the parallel index generation unit simultaneously processes the second comparison output s in an element index register to calculate the element index number for the final winning index. In selected embodiments where the vector comparator system uses a 128-element vector comparator to evaluate N numbers (e.g., N=2, 4, 8, 16, 32, 64, 128, 256, etc.), the vector comparator operations may be invoked with a single instruction call to return the final winning index for the maximum or minimum number after T cycles, where T=L+(N/128)+7 (when N>128) or T=L+1+log2(N) (when N≤128), and where the L cycles are due to loading "latency." As disclosed herein, the set of numbers being evaluated can be real or complex numbers, where the multi-element vector comparator hardware returns the peak value (e.g., max/min) of the real portion of any complex numbers, and the final winning index represents the complex element.

In this disclosure, an improved system, apparatus, and method are described for quickly finding a peak value (e.g.

maximum or minimum number) from a set of numbers in an input data vector with a programmable vector comparator unit (VCU) and index generation unit (IGU) arranged in a parallel architecture to address various problems in the art where various limitations and disadvantages of conventional solutions and technologies will become apparent to one of skill in the art after reviewing the remainder of the present application with reference to the drawings and detailed description provided herein. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Turning now to FIG. 1, there is shown a simplified block diagram of a wireless communication system 100 having a plurality of wireless devices or subscriber stations 102, 122 (e.g., hand-held computers, personal digital assistants (PDAs), cellular telephones, etc.) that wirelessly communicate with one or more base station systems (BSS) 110 (e.g., enhanced Node-B or eNB devices). Each wireless devices 102 may include a processor 108 (e.g., a digital signal processor), a transceiver 106 connected to one or more antennas 109, and one or more input/output devices 104 (e.g., a camera, a keypad, display, etc.), along with other components (not shown). The wireless devices 102, 122 communicate with a baseband (BB) modem 112 of the base station subsystem 110 via one or more antennas 111, 119 and base transceiver stations (BTS) 114 to receive or transmit voice, data, or both voice and data. The BB modem 112 may, for example, be configured to schedule communications for the wireless devices 102, 122, and to otherwise exchange signal information with the BTS 114 over one or more communication links 113.

In the embodiments shown, the base transceiver station(s) 114 include a digital front end (DFE) processor 115 which may be implemented as a single integrated circuit to provide the digital components of the cellular base station RF subsystem. The digital components consolidated on the DFE 115 may include one or more control processors and digital transmit/receive filters, as well as interface peripherals and other I/O for RF subsystem functions. In addition and as described more fully below, the DFE 115 may include a transmit and/or receive processing path for each antenna which performs signal processing on the signal that is provided to or received from a power amplifier and associated antenna, thereby forming a separate DFE-power amplifier chain for each antenna. As will be appreciated, the digital front end circuit may also be used in connection with a multi-antenna wireless communication device, such as the wireless devices 102, 122. To this end, each wireless device 102 may also include a digital front end processor (not shown) connected to a corresponding transceiver unit 106 which includes a transmit and/or receive processing path for each antenna which performs signal processing on the transmit signal.

Figure 2A:
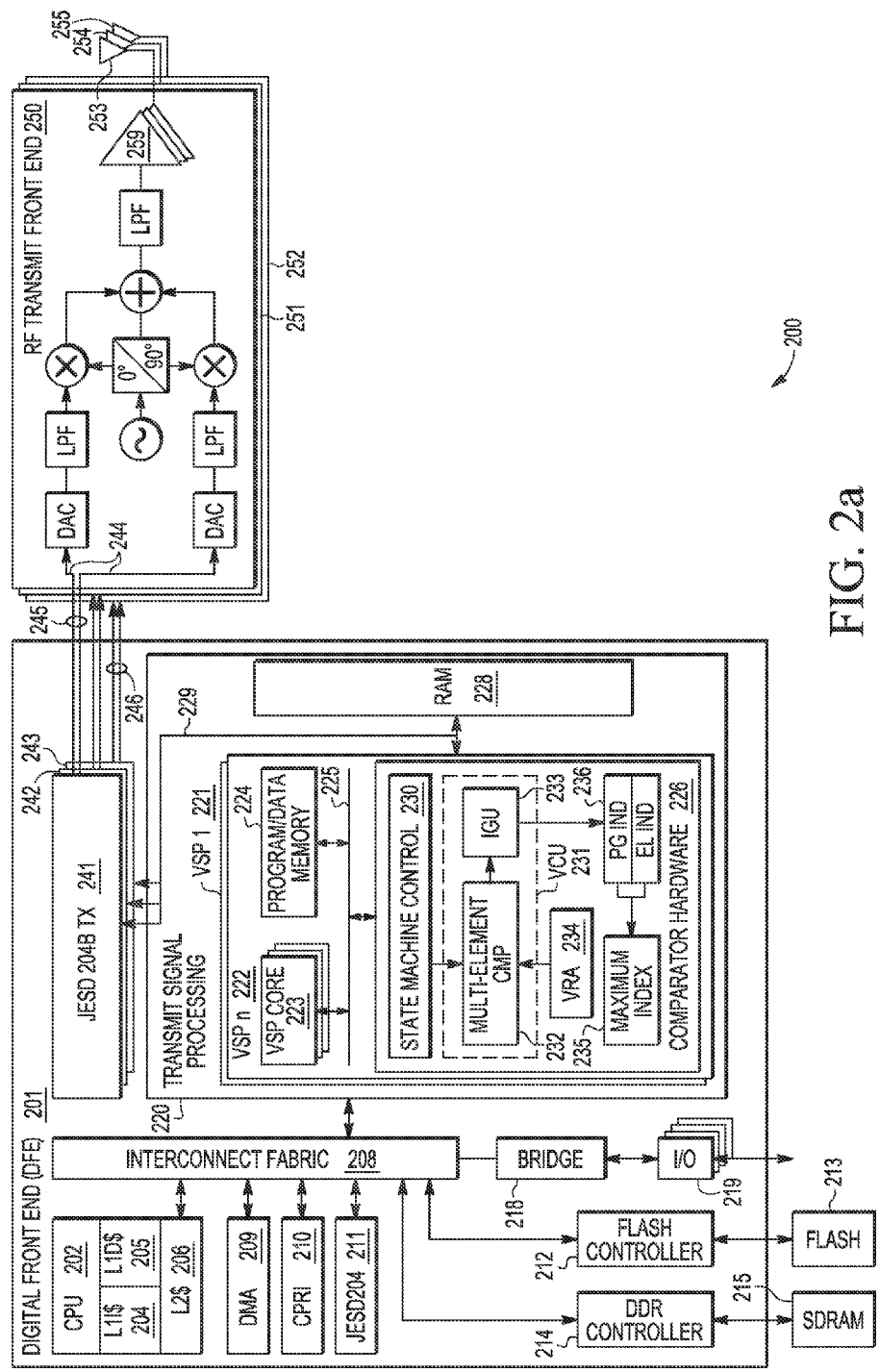
FIGS. 2*a-b* show a block diagram illustration of a base station system having a multi-antenna radio frequency (RF) subsystem connected to a single chip digital front end (DFE) processor having an integrated vector comparator hardware unit for finding a peak number.

To illustrate an example application for a programmable vector comparator system, apparatus, and methodology disclosed herein, reference is now made to FIG. 2a which depicts a high level architecture block diagram illustration of a multi-antenna radio frequency (RF) subsystem 200 having an integrated vector comparator hardware unit 231 for finding a peak number from an input data vector set of numbers 234. The RF subsystem 200 is connected to a base station controller (not shown) and may be implemented as a single chip digital front end (DFE) processor 201 connected to a plurality of RF transmit or transceiver front end circuits 250-252. As will be appreciated, a radio receiver front end may be understood to refer to all circuitry between the antenna and the first intermediate frequency (IF) stage, including analog and digital receiver components that process the signal at the original incoming radio frequency (RF) before it is converted to an intermediate frequency (IF). For simplicity of illustration, the transmit antennas 253-255 are shown as being connected to the respective transmit front end circuits 250-252, but it will be appreciated that the transmit antennas 253-255 may be shared for both signal transmission and reception in a shared or switched circuit arrangement. Of course, it will be appreciated that selected embodiments may implement a comparator system, apparatus, and/or methodology with a plurality of integrated circuit chips and/or with other circuitry.

Connected to each transmit antenna (e.g., 253) is an RF transmit front end circuit (e.g., 250) which includes RF conversion circuit components (e.g., digital-to-analog converters, low pass filters, oscillators, splitters, mixers, amplifiers, etc.) for converting and filtering the digital I and Q samples 244 output by the DFE processor 201 to a combined analog signal that is filtered and amplified (e.g., with one or more RF power amplifiers 259) for transmission by a corresponding antenna (e.g., 253). In similar fashion, each receive antenna may be connected to an RF receive front end circuit (not shown) which includes RF conversion circuit components (e.g., bandpass filters, splitters, low pass filters, oscillators, mixers, amplifiers, analog-to digital converters, etc.) that process the signal from the antenna received at the original incoming radio frequency (RF) and convert it for processing by the DFE processor 201. Though the RF front end circuits (e.g., 250) employ the depicted RF conversion and power amplifier circuit components, it will be appreciated that other RF conversion circuit arrangements and power amplifier components can be used.

The depicted digital front end processor 201 is provided to perform digital signal processing for the RF base station subsystem 200 across the separate transmit paths to antennas 253-255. To this end, the DFE processor 201 partitions transmit signals to the antennas into transmit processing paths, and communicates with the baseband modem through the Common Public Radio Interface (CPRI) interface 210 and/or JESD204A/B interface 211. The DFE processor 201 may include one or more control processors 202 (e.g., one or more processor cores), memory subsystems (e.g., L1 instruction cache 204, L1 data cache 205, L2 cache 206), memory controllers (e.g. DMA controller 209, flash controller 212, and DDR controller 214) for interfacing with external memory (e.g. Flash memory 213, SDRAM 215), one or more modem interfaces (e.g., CPRI interface 210 and JESD204A/B interface 211), and I/O facilities (e.g., host bridge 218) for I/O devices 219. As a general matter, any of a variety of memory designs and hierarchies may be employed in, or in conjunction with, with the DFE processor 201. Also, it will be appreciated that the I/O devices 219 may include any desired 110 device, such as Ethernet, I2C, SPI, GPIO, and/or UART devices. All processor subsystems are linked by a multi-level interconnect fabric 208.

To digitally process transmit signals, the DFE processor 201 may also include a programmable transmit signal processing path for each transmit antenna 253-255 which is formed with a transmit signal processor 220 and an associated serialized interface 241-243 (e.g., a JESD204B TX interface) and RF transmit front end 250-252. The transmit signal processor 220 may include one or more processors 221-222 (e.g., vector signal processors VSP1 and VSPn) and associated memory 228 (e.g., RAM) for performing carrier-related signal processing and antenna-specific processing on IQ samples received from the baseband modem. Signal processing along each transmit signal path may be divided between the processors 221-222 and shared memory 228. For example, a first vector signal processor 221 (VSP 1) may be used to perform a first set of processing tasks and store the results in the shared RAM 228. At this point, a second vector signal processor 222 (VSP n) may be used to perform additional signal processing on the output IQ samples retrieved from shared memory 228. Once signal processing is completed, the transmit signal processor 220 may send the processed samples over a signal/buss line 229 to an associated serialized interface (e.g., JESD204B TX 241) for transfer to the transceiver (e.g., 250) over IQ signal lines 244. In this way, the first vector signal processor 221 may perform a variety of different signal processing tasks for a first antenna path formed by the connection of the transmit signal processor 220 and JESD204B TX interface 241 which are connected over IQ signal lines 244 to transceiver 250 and antenna 253.

An example signal processing task for a vector signal processor 221, 222 would be a peak identification task, such as finding a maximum or minimum value (and its corresponding location or index value) in a set of numbers representing input signal samples which are processed using crest factor reduction algorithms to detect peaks in the signal envelope above a certain threshold, or which are otherwise processed to identify localized waveform peaks (e.g., maximum or minimum values) when synchronizing signals. However, conventional peak evaluation techniques suffer from a variety of drawbacks, such as sequentially processing incoming data points too slowly to meet real-time processing requirements, having limited data vector size processing capabilities, or otherwise failing to provide location information for the winning max/min value. To provide an autonomous vector comparator system that can be programmed to work on varying data sizes, the vector signal processor (e.g., 222) may include one or more VSP processor cores 223, a program and data memory 224, an integrated comparator hardware unit (CHU) 226, and other control and arithmetic units (not shown), all of which are connected together over an interface bus 225. As will be appreciated, the program/data memory 224 may include both volatile and non-volatile memory components for storing program instructions, code, or other programmatic elements along with associated data. And though the vector signal processor 222 shows a specific number of elements interconnected in a specific fashion, additional and/or fewer elements may be included and interconnected in a different fashion.

Based on programming and/or data input from vector signal processor 222 and/or program/data memory 224, the integrated comparator hardware unit 226 may be programmably configured to quickly find a peak value and location from a set of numbers stored in a vector register array (VRA) 234. In the depicted example, the VRA 234 is a 256×8 16 bit element register array which can store up to 16 pages of an input data vector—where each page has 128 elements—to be evaluated for a max/min value. In general terms, a page refers to a subset of elements of the input data vector, typically having a uniform size or number of elements so that the input data vector may be divided into one or more subsets. For example, the VSP processor core 223 may decode one or more first instructions stored in program/data memory 224 which provide programming parameters to the comparator hardware unit 226 to identify a maximum (or minimum) peak value from the numbers stored in the VRA 234. It will also be appreciated that, for number sets with more than 256×8 values, newer values may be read into the VRA from data memory while the comparator unit is working on previously loaded numbers. At the comparator hardware unit 226, a vector comparator unit 231 responds to the one or more first instructions with a multi-element comparator (CMP) 232 and a parallel index generation unit (IGU) 233 which are controlled by the state machine unit 230 to find the maximum (or minimum) value from a variable size set of numbers stored in the VRA 234. As will be appreciated, the functionality represented by the state machine unit 230 may be implemented as a state machine, dedicated hardware or control logic, one or more processing devices, firmware or software that is tangibly embodied in a computer processing device, such as a microprocessor, micro-controller, digital signal processor, microcomputer, central processing unit, field programmable gate array, programmable logic device, state machine, logic circuitry, analog circuitry, digital circuitry and/or any device that generates control signals. The maximum (or minimum) value identified by the comparator hardware unit 226 may be specified with a corresponding page and element index values 236 which define a maximum (or minimum) index value 235 specifying the location of the maximum (or minimum) value in the VRA 234.

Figure 2B:
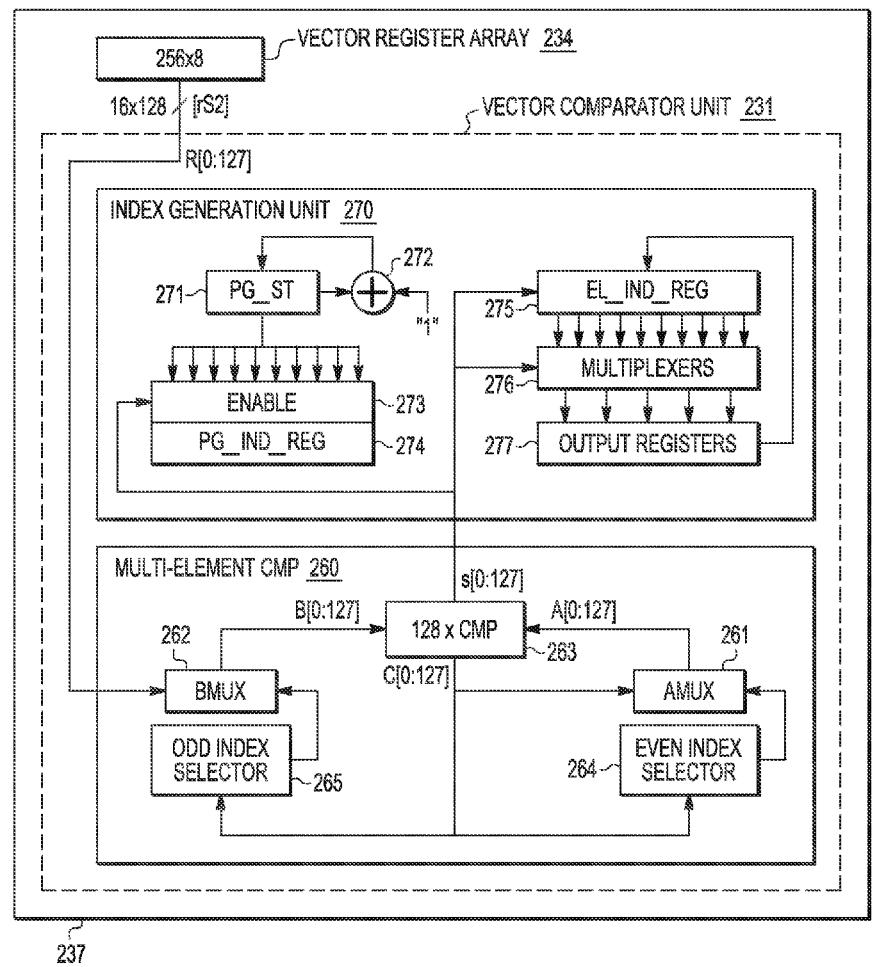

To illustrate selected example embodiments of the comparator hardware unit 226, FIG. 2b shows that the vector comparator unit 231 and vector array register 234 may be implemented with a comparator hardware or firmware structure 237 to define a multi-element comparator (CMP) 260 and index generation unit 270. The multi-element comparator 260 includes a multi-element vector comparator 263 having a fixed size (e.g., 128 elements), though different sizes (e.g., 64-element or 256 element CMPs) may still be used to locate peak values as described herein. As described herein, the multi-element comparator 260 may be configured to evaluate input data vectors that are larger than the fixed size of the multi-element vector comparator 263 by first using the multi-element vector comparator 263 in parallel to sequentially process data in "vector" units, and then automatically switching to a leaf/tree mode search after contending candidate set is reduced to fit within the fixed size of the multi-element vector comparator 263. To this end, the vector comparator 263 is coupled to receive first and second multiplexed inputs A[0:127], B[0:127] from a first multiplexer 261 (A MUX) and second multiplexer 262 (B MUX), respectively, and to generate therefrom first and second comparison outputs C[0:127], s[0:127]. The first multiplexer 261 is coupled to receive a first input from the comparison output C[0:127] of the vector comparator 263, and to receive a second input from an even index selector circuit 264 which in turn receives the comparison output C[0:127] from the vector comparator 263. In similar fashion, the second multiplexer 262 is coupled to receive a first input from the vector array register 234, and to receive a second input from an odd index selector circuit 265 which in turn receives the comparison output C[0:127] from the vector comparator 263. In this configuration, the vector comparator 263 responds to state machine control signals defining a page operational mode to compare successive pages from the input data vector stored in the VRA 234 by sequentially loading each page from the second multiplexer 262 for comparison with the preceding page loaded from the first multiplexer 261. In this page mode, the vector comparator 263 generates a search set of the comparison winners from all pages of the input data vector at the comparison output C[0:127]. Once all pages of the input data vector have been processed, the state machine control signals define an element operational mode wherein the multi-element comparator 260 performs tree reduction processing to reduce the search set and find the max/min number. To this end, the first and second multiplexers 261, 262 are configured to pass their second inputs to the vector comparator 263 for a plurality of comparison cycles to effectively compare adjacent elements and shift the winner result to the least significant bit position(s) at the comparison output C[0:127] from the vector comparator 263. Each iteration in the element mode moves the max/min value right towards least significant location.

In addition to identifying the max/min value, the vector comparator unit 231 keeps track of the index value for the winning max/min value being located by the multi-element comparator 260. To this end, the comparator hardware or firmware structure 237 includes an index generation unit 270 which processes the second comparison output select value s[0:127] from the vector comparator 263 using a page mode index circuit 271-274 and an element mode index circuit 275-277.

In the page mode index circuit 271-274, a page state register 271 (PG_ST) may be initialized with a zero value and selectively applied via enable circuitry 273 to a plurality of page elements in a page index register 274 (e.g., PG_IND_REG=[$p_{127}$:$p_0$]), depending on the value of the second comparison output select value s[0:127] supplied to the enable circuitry 273. For example, during the first comparison iteration at the multi-element comparator 260, the multi-element comparator 260 compares the first page of input data values from the VRA 234 (provided by the second multiplexer 262) against initial reference input data values (provided by the first multiplexer 262). If the first comparison iteration at the multi-element comparator 260 determines that the winning element at CMP element i was provided by the second multiplexer 262 (e.g., B[i]), then the CMP element i generates a first comparison output C[i]=B[i]. At the same time, the CMP element i generates a second comparison output select value s[i] identifying the source of the winning element (namely, the first page of input data values from the second multiplexer 262). At the page mode index circuit 271-274, the second comparison output select value s[i] is applied to the enable circuitry 273 so that the current page count stored in the page state register 271 is stored at the corresponding element of the page index register 274. If the winner is B[i], s[i] turns enable ON so that the $i^{th}$ position of the page index register gets overwritten by the current value of the page state register. If the winner is A[i] then s[i] does not turn enable ON so that the $i^{th}$ position of the page index register retains its current value. For each iteration during the page operational mode, the value of the page state register 271 is incremented by the adder 272, thereby updating the page count supplied to the page index register 274 via enable circuitry 273 for that iteration.

The comparator hardware/firmware structure 237 may also include an element mode index circuit 275-277 having an element index register 275 and bank of multiplexers 276 connected to an output register 277 under control of selected comparison output select values s[0:63] for feedback to the element index register 275. In the element mode index circuit 275-277, the element index register 275 (EL_IND_REG) stores a plurality of multi-bit element index values which are processed to identify the element index value for the final winning value. In selected embodiments, the element index register 275 is a 64×7 bit register for storing 64 7-bit element index values [$e_{63}$:$e_0$], enabling each element index value to store values ranging from 0 to $2^7$=128. During a first cycle of the element mode, the element index register 275 may be initialized with initial element values and then updated by writing the selected comparison output select value s[0:63] to the least significant bit position of the respective element index values [$e_{63}$:$e_0$] in the element index register 275. During subsequent cycles of the element mode, adjacent pairs of element index values from the element index register 275 are selectively passed to an output register 277 for feedback to the lower half of the element index register 275 using a bank of multiplexers 276 which are controlled by the lower half of the comparison output select values s[i]. Each iteration of the element mode index circuit 275-277 moves the element index value corresponding to the max/min value towards least significant location of the element index register 275.

Figure 3:
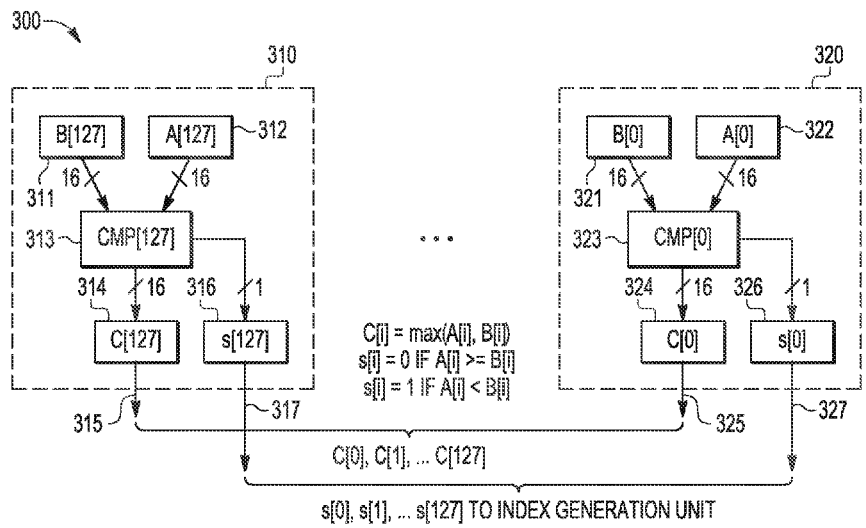
FIG. 3 is a simplified block diagram of a vector comparator unit having a plurality of multi-bit comparator blocks with their respective inputs and outputs.

Turning now to FIG. 3, there is illustrated simplified block diagram of a multi-element vector comparator 300 having a plurality of multi-bit comparator blocks 310, 320. As will be appreciated, the design and functional operation of the multi-element vector comparator 300 corresponds in general to the multi-element comparator 232 shown in FIG. 2a and the multi-element comparator 260 shown in FIG. 2b. As illustrated, the first comparator block 310 for the most significant element includes a multi-bit comparator 313 (e.g., CMP [127]) which is coupled to receive first and second multi-bit inputs A[127], B[127] from input registers 312, 311, respectively. Based on the results of the comparison, the multi-bit comparator 313 selects one of the multi-bit inputs A[127], B[127] for the output value C[127] that is stored at the multi-bit comparison output register 314, and also generates a single-bit output select value s[127] for storage at output select register 316 for specifying which of the multi-bit inputs A[127], B[127] was the source of the winning value. In similar fashion, the second comparator block 320 for the least significant element includes a multi-bit comparator 323 (e.g., CMP[0]) which is coupled to receive first and second multi-bit inputs A[0], B[0] from input registers 322, 321, respectively. Based on the results of the comparison, the multi-bit comparator 323 selects one of the multi-bit inputs A[0]. B[0] for output as a multi-bit comparison output C[0] and storage at multi-bit comparison output register 324, and also generates a single-bit output select value s[0] for storage at output select register 326 which specifies which of the multi-bit inputs A[0], B[0] was the source of the winning value. Stated more generally, each of the i comparator blocks in the multi-element vector comparator 300 include a multi-bit comparator (e.g., CMP[i]) which is coupled to receive first and second multi-bit inputs A[i], B[i] from first and second input registers, and to generate therefrom a multi-bit comparison output C[i] and a single-bit output select value s[i]. In an example embodiment for finding a maximum value, the multi-bit comparison output C[i] is the larger of the multi-bit inputs A[i], B[i] (e.g., C[i]=max (A[i], B[i]), and the single-bit output select value s[i] has a first value (e.g., s[i]=0) if the first multi-bit input A[i] is greater or equal to the second multi-bit input B[i], but has a second value (e.g., s[i]=1) if the first multi-bit input A[i] is less than the second multi-bit input B[i]. In this way, the multi-bit comparison output values C[i] 315, 325 and single-bit output select value s[i] 317, 327 generated by the plurality of multi-bit comparator blocks 310, 320 may be provided to the comparator unit and index generation unit, respectively, as described herein below.

Figure 4:
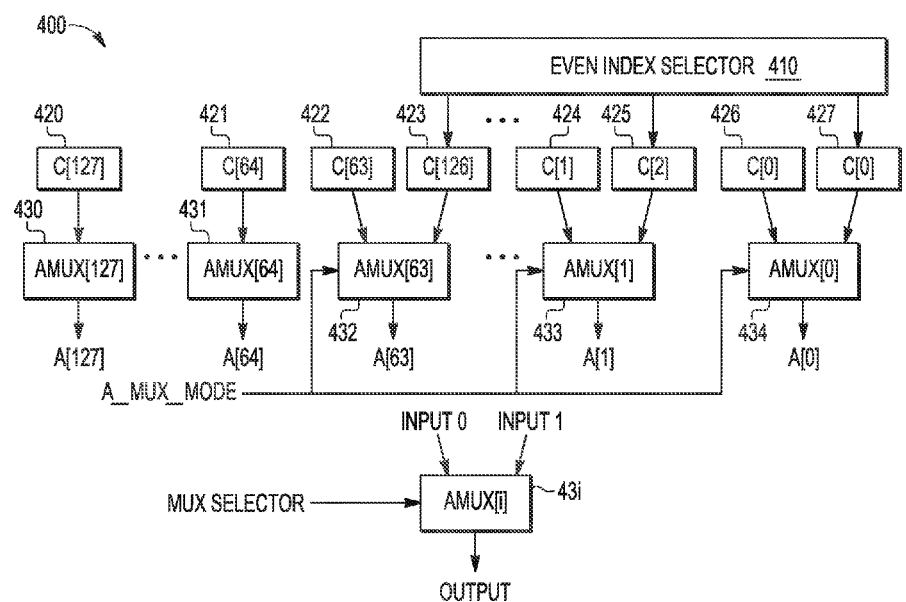
FIG. 4 is a simplified block diagram of a first set of input multiplexers used to provide a first set of inputs to the plurality of multi-bit comparator blocks.

Turning now to FIG. 4, there is illustrated a simplified block diagram 400 of a first set of input multiplexers AMUX[i] 430-434 that are coupled to provide feedback from the multi-bit comparison output registers C[i] 420-427 to a first set of input registers A[i] for a plurality of multi-bit comparator blocks, depending on the operational mode of the vector comparator system. As will be appreciated, the design and functional operation of the input multiplexers AMUX[i] 430-434, multi-bit comparison output registers C[i] 420-427, and even index selector 410 corresponds in general to the multiplexer 261 (A MUX), multi-element vector comparator 263, and even index selector 264 shown in FIG. 2b. As illustrated, each of the first set of input multiplexers AMUX[0:127] 430-434 is coupled to receive at least a first input from one of the multi-bit comparison output registers C[0:127] 420-422, 424, 426. In addition, the lower half of the input multiplexers AMUX[0:63] (e.g. 432-434) is coupled to receive a second input from the even-numbered multi-bit comparison output registers C[0, 2, 4 . . . , 126] 427, 425, 423 provided by the even index selector circuit 410. As a result, the upper half of the input multiplexers AMUX[64:127] (e.g., 430-431) receive only a single input, but the lower half of the input multiplexers AMUX[0:63] (e.g., 432-434) each receive two inputs. To control the operation of the first set of input multiplexers AMUX[i] 430-434, a multiplexer mode control signal A_MUX_MODE is applied in common to the lower half of the input multiplexers AMUX[0:63]. When the multiplexer mode control signal A_MUX_MODE has a first value (e.g., 0) indicating a page mode of operation, the first set of input multiplexers AMUX[0:127] 430-434 respectively output the inputs from the multi-bit comparison output registers C[0:127] 420-422, 424, 426. The resulting operation feeds the output from the multi-bit comparison output registers C[0:127] 420-422, 424, 426 back as inputs to the first set of input registers A[0:127] for the plurality of multi-bit comparator blocks. However, when the multiplexer mode control signal A_MUX_MODE has a second value (e.g., 1) indicating an element mode of operation, the lower half of the selected input multiplexers (e.g., AMUX[0:63]) respectively output the values from the even-numbered multi-bit comparison output registers C[0, 2, 4 . . . , 126] 427, 425, 423 provided by the even index selector circuit 410. The resulting operation loads values from the even-numbered multi-bit comparison output registers C[0, 2, . . . , 126] for comparison with adjacent odd-numbered multi-bit comparison output registers C[1, 3, . . . , 127] at the plurality of multi-bit comparator blocks. In this mode, the upper half of the input multiplexers AMUX[64:127] (e.g., 430-431) can be ignored since they are not used in the tree reduction operations performed by the plurality of multi-bit comparator blocks. In FIG. 4, the generic operation of input multiplexer 43$i$ is shown as being controlled by the multiplexer mode control signal (MUX Selector) to selectively pass the inputs (Input 0, Input 1) to the multiplexer output (Output).

Figure 5:
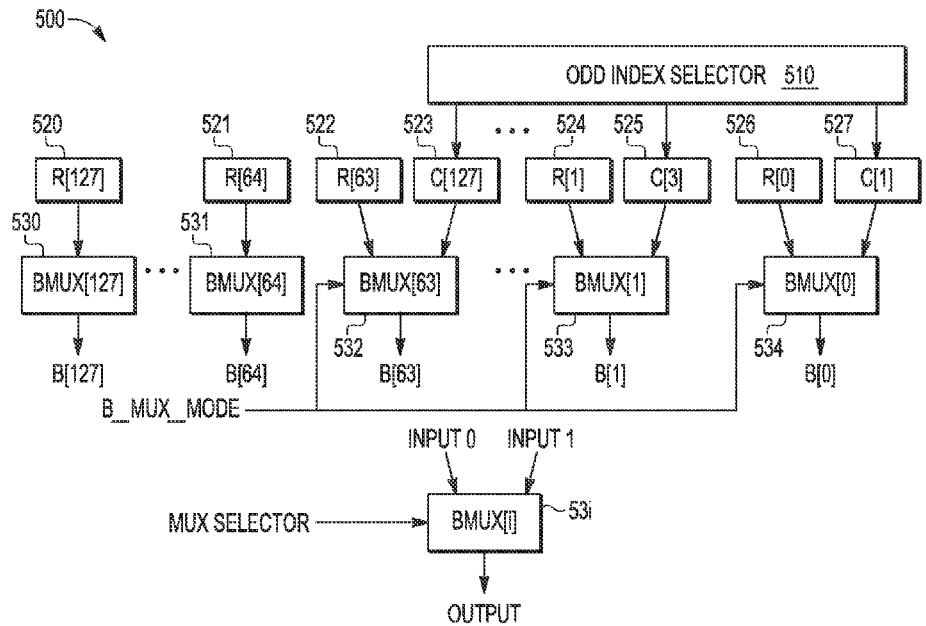
FIG. 5 is a simplified block diagram of a second set of input multiplexers used to provide a second set of inputs to the plurality of multi-bit comparator blocks.

Turning now to FIG. 5, there is illustrated a simplified block diagram 500 of a second set of input multiplexers BMUX[i] 530-534 that are coupled to provide a second set of input values B[i] to a plurality of multi-bit comparator blocks (such as the CMP circuits 313, 323 shown in FIG. 3), depending on the operational mode of the vector comparator system. As will be appreciated, the design and functional operation of the input multiplexers BMUX[i] 530-534, multi-bit comparison output registers C[1, 3 , . . . , 127] 527, 525, 523, vector register array R[0:127] 520-522, 524, 526, and odd index selector 510 corresponds in general to the multiplexer 262 (B MUX), multi-element vector comparator 263, and odd index selector 265 shown in FIG. 2b. As illustrated, each of the second set of input multiplexers BMUX[0:127] 530-534 is coupled to receive at least a first input from one of the vector register array R[0:127] 520-522, 524, 526. In addition, the lower half of the input multiplexers BMUX[0:63] (e.g., 532-534) is coupled to receive a second input from the odd-numbered multi-bit comparison output registers C[1, 3, . . . , 127] 527, 525, 523 provided by the odd index selector circuit 510. As a result, the upper half of the input multiplexers BMUX[64:127] (e.g. 530-531) receive only a single input, but the lower half of the input multiplexers BMUX[0:63] (e.g. 532-534) each receive two inputs. To control the operation of the second set of input multiplexers BMUX[i] 530-534, a multiplexer mode control signal B_MUX_MODE is applied in common to the lower half of the input multiplexers BMUX[0:63]. When the multiplexer mode control signal B_MUX_MODE has a first value (e.g., 0) indicating a page mode of operation, the second set of input multiplexers BMUX[0:127] 530-534 respectively output the inputs from the vector register array R[0:127] 520-522, 524, 526. The resulting operation loads a page of input data values from the input data vector stored in the vector register array. However, when the multiplexer mode control signal B_MUX_MODE has a second value (e.g., 1) indicating an element mode of operation, the lower half of the selected input multiplexers (e.g., BMUX[0:63]) respectively output the values from the odd-numbered multi-bit comparison output registers C C[1, 3, . . . , 127] 527, 525, 523 provided by the odd index selector circuit 510. The resulting operation loads values from the odd-numbered multi-bit comparison output registers C[1, 3, . . . , 127] for comparison with adjacent even-numbered multi-bit comparison output registers C[0, 2, . . . , 126] at the plurality of multi-bit comparator blocks. In this mode, the upper half of the input multiplexers BMUX[64:127] (e.g., 530-531) can be ignored since they are not used in the tree reduction operations performed by the plurality of multi-bit comparator blocks. In FIG. 5, the generic operation of input multiplexer 53$i$ is shown as being controlled by the multiplexer mode control signal (MUX Selector) to selectively pass the inputs (Input 0, Input 1) to the multiplexer output (Output).

Figure 6:
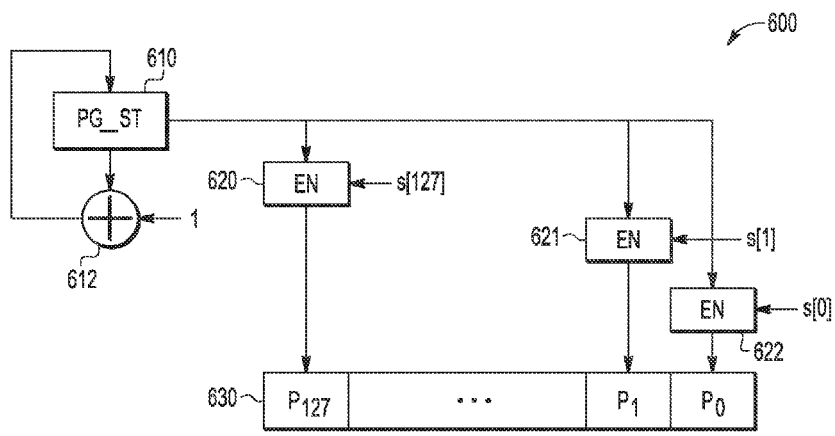
FIG. 6 depicts the initialization and programming of a page index register in in the index generation unit circuitry used in a page mode of operation.

Turning now to FIG. 6, there is illustrated a simplified block diagram of a page mode index circuit 600 for initializing and programming a page index register 630 (PG_IND_REG) which stores a plurality of multi-bit page elements [p$_{127}$:p$_0$] in the index generation unit during a page mode of operation. As will be appreciated, the design and functional operation of the page mode index circuit 600 corresponds in general to the index generation unit 233 shown in FIG. 2a and the page mode index circuit 271-274 shown in FIG. 2b. As illustrated, the page mode index circuit 600 includes a page state register 610 (PG_ST) connected in feedback with an incrementation of adder circuit 612 to sequentially increase the value of the page state register 610 at each iteration. The page state register 610 may be provided as a multi-bit register (e.g., 4 bits) for identifying a plurality of pages (e.g., $2^4$=16) from the input data vector stored. In operation, the page state register 610 is initialized with a zero value and selectively applied across the plurality of enable or pass circuits 620, 621, 622 to a corresponding plurality of page elements [p$_{127}$:p$_0$] in a page index register 630 (PG_IND_REG), depending on the value of the comparison output select value s[127:0] supplied to the plurality of enable or pass circuits 620-622. As will be appreciated, each of the multi-bit page elements [p$_{127}$:p$_0$] is sized to store up to the maximum page count value (e.g., 4 bits). During each comparison iteration of the page mode index circuit 600, the comparison output select value s[i] generated by the multi-bit comparators CMP[0:127] 313. 323 are applied to the enable/pass circuits 620-622 so that the current value of the page state register 610 is stored at the corresponding element $p_i$ of the page index register 630 if the comparison output select value s[i] has a first value (e.g., 1) indicating that the first multi-bit input A[i] is less (or more in case of "min" operation) than the second multi-bit input B[i]. On the other hand, if the first multi-bit input A[i] is not less (not more in case of "min" operation) than the second multi-bit input B[i], the comparison output select value s[i] has a second value (e.g., 0) which prevents the enable/pass circuits 620-622 from storing the current value of the page state register 610 to the corresponding element $p_i$ of the page index register 630. Upon completion of the comparison iterations in the page mode, each element $p_i$ of the page index register 630 identifies the page from the input data vector where the winning value for element i is located.

Figure 7A:
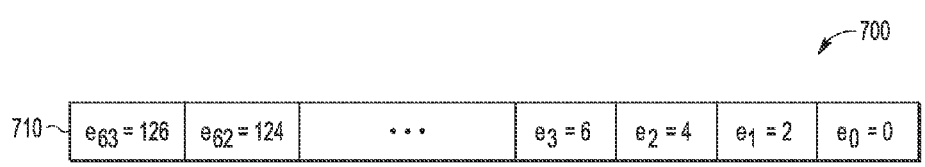
FIGS. 7*a-c* depict the initialization and programming of an index register in the index generation unit circuitry used in an element mode of operation.

Turning now to FIG. 7a, there is illustrated a simplified block diagram 700 of an element index register 710 (EL_IND_REG) which stores a plurality of multi-bit element index values [$e_{63}$:$e_0$] for tracking the winning index value for the winning candidate identified by the vector comparator system. As will be appreciated, the design and use of the element index register 710 corresponds in general to the element index register 275 shown in FIG. 2b. In selected embodiments, the element index register 710 is part of an element mode index circuit in the index generation unit, and may be initialized with state machine programming control signals for a first cycle of the element mode of operation which is identified with a flag (e.g., EL_START-BIT) that may be set to a first value (e.g., 1) for the first cycle, and then reset to a second value (e.g., 0) after the first cycle. To track the element index of the winning value, the element index register 710 is provided with storage space that is sufficient to store up to maximum number of candidate element indices, (e.g., 63), each with the maximum element index value (e.g., 128) for each tree reduction operation performed by the CMP circuits 313, 323. For example, the element mode processing of 128 multi-bit comparator blocks may be tracked with a 64×7 bit element index register 710 for storing 64 7-bit element index values [$e_{63}$:$e_0$], enabling each element index value to store one of 128 values ranging from 0 to 127. During a first cycle of the element mode, the element index register 710 may be initialized with initial element values such that each element $e_i$ stores twice the index value 2i (e.g., $e_0$=0, $e_1$=2, $e_2$=4, . . . $e_{63}$=126).

Figure 7B:
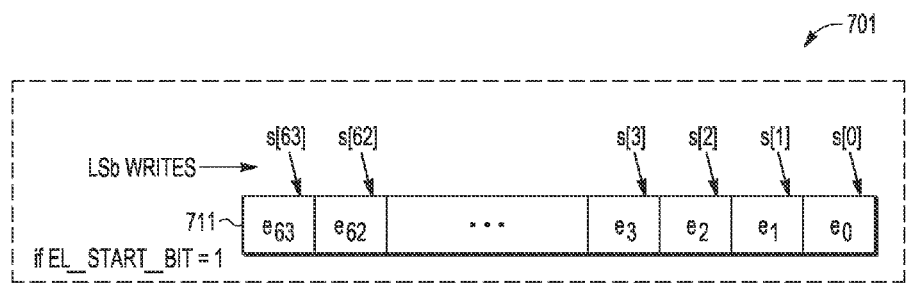

Turning now to FIG. 7b, there is illustrated a simplified block diagram 701 of the element index register 711 (EL_IND_REG) wherein the plurality of multi-bit element index values [$e_i$] are updated during the first cycle of the element mode by writing selected comparison output select value s[i] to the least significant bit (LSB) position of the respective element index values[$e_i$] in the element index register 711. As will be appreciated, the design and use of the element index register 711 corresponds in general to the element index register 275 shown in FIG. 2b. In selected embodiments, the element index register 711 is part of an element mode index circuit in the index generation unit, and may be updated under control of state machine programming control signals. In the depicted example, the result of the first comparison iteration of the element mode is that the comparison output select value s[0:63] generated by the multi-bit comparators CMP[0:63] are stored at the least significant bit position of the corresponding element index values [$e_{63}$:$e_0$]. If the comparison output select value s[i] has a first value (e.g., 1) indicating that the first multi-bit input A[i] is less (or more, in case of 'min' operation) than the second multi-bit input B[i], then a "1" is written to the least significant bit position of the element index $e_i$. But if the first multi-bit input A[i] is not less (or not more, in case of "max" operation) than the second multi-bit input B[i], the comparison output select value s[i] has a second value (e.g., 0) which is written to the least significant bit position of the element index $e_i$. The result of the LSB update is that each element index value [$e_{63}$:$e_0$] stores the index value for the winning element identified by the CMP circuits 313, 323 in the first cycle of the element mode. After the first cycle of the element mode, the EL_START_BIT flag may be reset for subsequent processing in a second element mode.

Figure 7C:
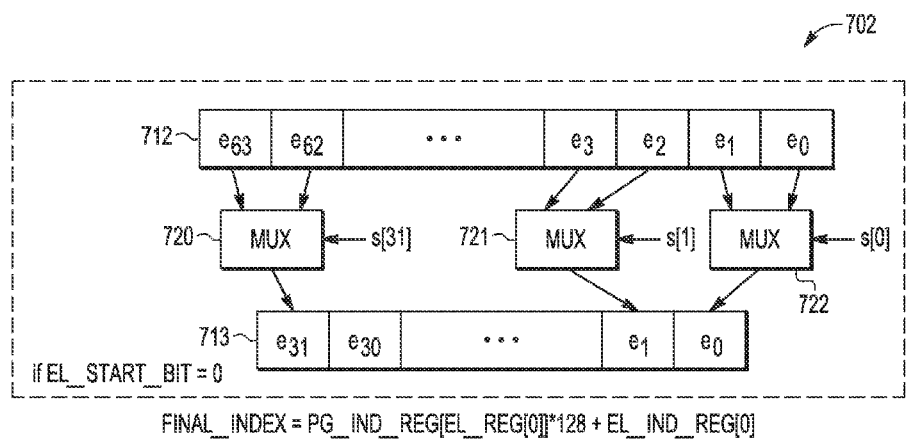

Turning now to FIG. 7c, there is illustrated a simplified block diagram 702 of the element index register 712 (EL_IND_REG) and a bank of multiplexers 720-722 connected to an output register 713 under control of selected comparison output select values s[0:63] for feedback to the element index register 712. As will be appreciated, the design and use of the element index register 712 and multiplexer bank 720-722 corresponds in general to the element index register 275 and multiplexer bank 276 shown in FIG. 2b. In selected embodiments, the element index register 711, multiplexer bank 720-722 and output register 713 are part of an element mode index circuit in the index generation unit, and may be updated under control of state machine programming control signals. In the depicted example, the element index register 712 (EL_IND_REG) stores a plurality of multi-bit element index values which are processed to identify the element index value for the final winning value. In selected embodiments, the element index register 712 is a 64×7 bit register for storing 64 7-bit element index values [$e_{63}$:$e_0$], and the output register 713 is a 32×7 bit register for storing 32 7-bit element index values [$e_{31}$:$e_0$], enabling each element index value to store values ranging from 0 to $2^7$=128. In selected embodiments, the output register for each iteration could be the same as the lower half of the input register for the iteration, thereby enabling reuse of the same hardware element index register for the entire element index mode of operation. During the second element mode, adjacent pairs of element index values from the element index register 712 are selectively passed to an output register 713 for feedback to the lower half of the element index register 275 using the multiplexer bank 720-722 which are controlled by the lower half of the comparison output select values (e.g. s[0:31]). Each iteration of the element mode index circuit 702 moves the element index value corresponding to the max/min value towards least significant location of the output register 713.

Figure 8:
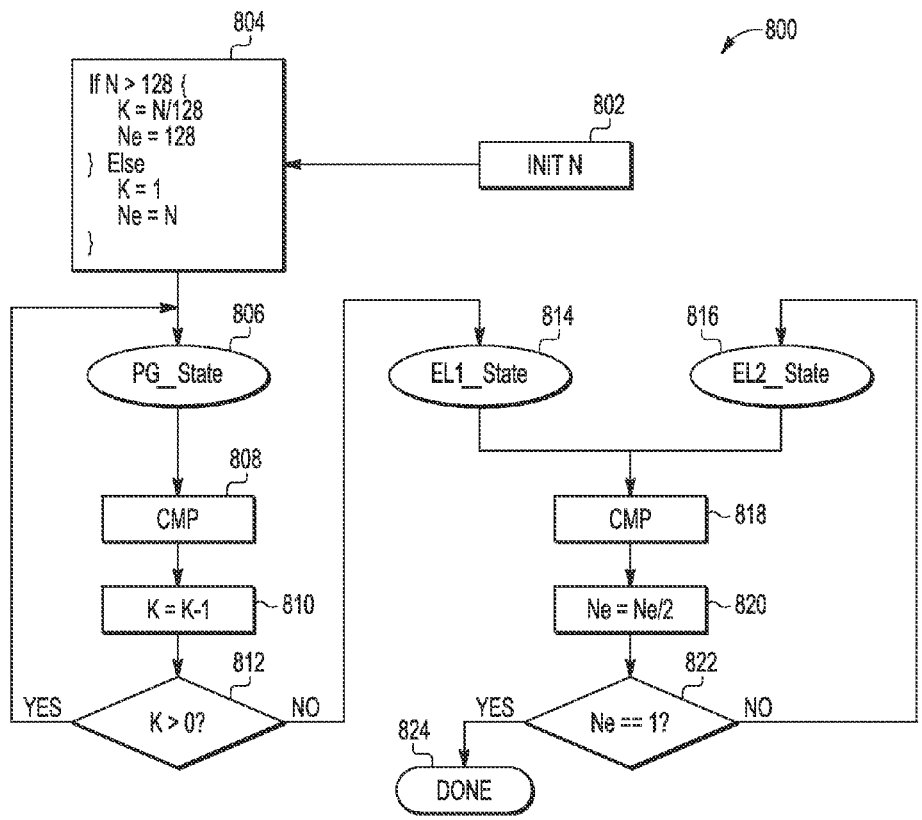
FIG. 8 is a state diagram illustrating the operation of the vector comparator hardware unit when configured in page and element modes of operation in accordance with selected embodiments of the present disclosure.

To illustrate the operation of the state machine operations used to control the vector comparator hardware unit, reference is now made to FIG. 8 which shows a state diagram 800 for the operation of the vector comparator hardware unit when configured in page and element modes of operation in accordance with selected embodiments of the present disclosure. As will be appreciated, the vector comparison operations may be initiated with a predetermined instruction call which provides programming parameters for initialing the register and multiplexer control signal values. For example, the vector comparator operations begin at step 802 by programming an input data vector size parameter N and otherwise initializing program parameters for the vector comparator hardware unit. As described herein, the input data vector size parameter N specifies the number of elements being evaluated or compared, where N can be any of N={2, 4, 8, 16, 32, 64, 128*M}, where M is any positive integer. As described hereinabove, the maximum value of N supported may require adjustments to the size of the page state register (PG_ST) and the page index elements [$p_{127}$:$p_0$] in the page index register. Also, the number 128 in the definition of set N above and the number of page index elements is for the example configuration using 128 multi-bit comparator blocks.

At step 804, the iteration counts for the page and element modes of operation may be set by the user and/or state machine control, depending on the size of the input data vector size parameter N relative to the number of multi-bit comparator blocks in the vector comparator. In an example embodiment where the vector comparator includes 128 multi-bit comparator blocks, the iteration count values set at step 804 will depend on whether the size of the input data vector size parameter N exceeds the number of multi-bit comparator blocks. If so (e.g., N>128), then a first iteration count parameter K is computed as the quotient N/128 and a second iteration count parameter Ne is set to Ne=128. If not (e.g., N≤128), then the first iteration count parameter K is set to K=1, and the second iteration count parameter Ne is set to Ne=N. In this way, the first iteration count parameter K represents the number of 128 element pages that must be processed by the vector comparator in the page mode, and the second iteration count parameter Ne controls the number of element mode iterations.

Next, the vector comparator operations enter a page mode of operation at page state 806 (PG_State) for at least one comparison iteration, depending on the value of the first iteration count parameter K. As an initial step 808, the vector comparator performs a first comparison whereby a first page of data retrieved from the vector register array is compared to a first reference value. This comparison may be accomplished at the multi-element vector comparator 263 by loading the first page of data via the second multiplexer 262 (B MUX) and loading the first reference value via the first multiplexer 261 (A MUX). When the vector comparator is configured to find the maximum value from the input data vector (e.g., MAX OP), the first reference value is a predetermined minimum value, and when the vector comparator is configured to find the minimum value from the input data vector (e.g., MIN OP), the first reference value is a predetermined maximum value. The result of the first comparison iteration is to load the first page of data from the vector register array into the multi-element vector comparator 263.

After the comparison iteration step 808, the first iteration count parameter K is decremented (e.g., K=K-1) at step 810, and the state machine determines at step 812 if the first iteration count parameter K>0. If so, the vector comparator operations return to the page state 806 for another comparison iteration in the page mode, and the steps 808, 810 are repeated until the first iteration count parameter K=0, indicating that the page mode is complete. In any subsequent comparison steps 808, the vector comparator compares a new page of data retrieved from the vector register array to the comparison results from the previous comparison step by loading the new page of data via the second multiplexer 262 (B MUX) and loading the previous comparison results via the first multiplexer 261 (A MUX). At the completion of the page mode, the output registers of the multi-element vector comparator store 128 candidate values that are guaranteed to contain the peak (e.g., max/min) value.

Once the page mode is complete, the vector comparator operations enter a plurality of element mode operations, starting with the first element (EL1) state 814 (EL1_State) for a first comparison iteration. In the first element state, the selection control signals to the first and second multiplexers 261, 262 are configured to pass their second inputs for comparison at step 818 so that the vector comparator effectively compares adjacent candidate values. This comparison may be accomplished at the multi-element vector comparator 263 by loading the candidate values having odd-numbered index values via the second multiplexer 262 (B MUX) and loading the candidate values having even-numbered index values via the first multiplexer 261 (A MUX).

After the comparison iteration step 818, the second iteration count parameter Ne is halved in value ((e.g., Ne=Ne/2) at step 820, and the state machine determines at step 822 if the second iteration count parameter Ne=1. If so, the vector comparator operations are complete (step 824). But if not, then the vector comparator operations enter a second element (EL2) state 816 (EL2_State) for one or more additional comparison iterations. In this second element state 816, steps 818 and 820 are repeated until the second iteration count parameter Ne=1, indicating that the element mode is complete. In each of the comparison steps 818, the successive comparison of candidate values having odd-numbered index values and even-numbered index values effectively shifts the winner result to the least significant bit position(s) at the comparison output C[0:127] from the vector comparator 263 so that each iteration in the element mode moves the max/min value right towards least significant location.

As seen from the foregoing, the vector comparator hardware unit described herein performs vector comparison operations using a plurality of operational modes. In a first page comparison mode, a plurality of parallel comparators sequentially process an input data vector in "vector" units to identify a candidate search set of the comparison winners from all pages of the input data vector. The vector comparator hardware unit then automatically switches to an element comparison mode to apply leaf/tree mode searching to the contending candidate search set. If the number of elements N in the input data vector exceeds the number of comparator elements (e.g., N>128), the vector comparator hardware unit runs in the first page comparison mode for the first N/128 cycles by performing a fresh load from the vector register array at each cycle, and then for the next 7 cycles, the vector comparator hardware unit runs in the element comparison mode to shift the winner result to the least significant bit position at the comparator output. On the other hand, if the number of elements N in the input data vector does not exceed the number of comparator elements (e.g., N≤128), the vector comparator hardware unit runs in the first page comparison mode for a single cycle to load the input data vector, and then the vector comparator hardware unit runs in the element comparison mode for log2(N) additional cycles to guarantee that the max/min of the lower M elements is at the right-most location.

Figure 9:
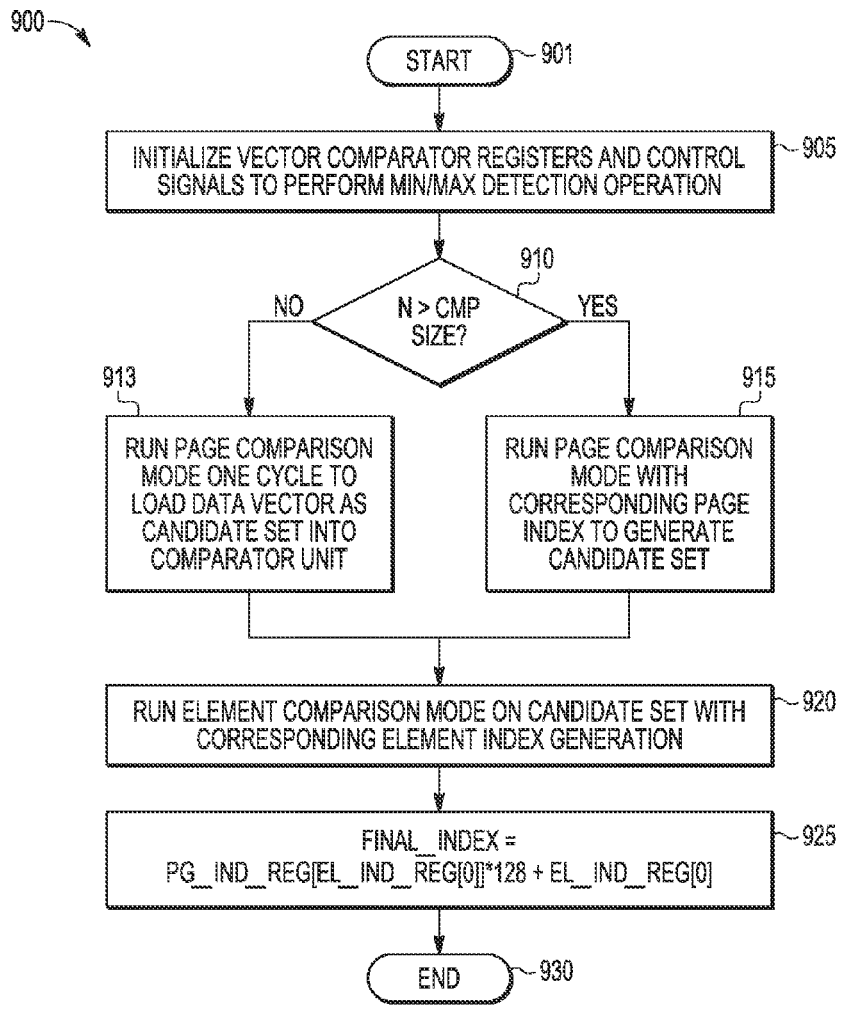
FIG. 9 shows an example flow diagram of a vector comparator method for quickly finding a peak number from a set of numbers.

Referring now to FIG. 9, there is depicted an example flow diagram 900 of a vector comparator method for quickly finding a peak number from a set of numbers in accordance with selected embodiments of the present disclosure. In the flow diagram 900, the method steps may be performed by vector comparator hardware or firmware having a parallel arrangement of a vector comparator unit (VCU) and index generation unit (IGU) controlled by control logic (e.g., at the DFE) to automatically detect and adapt operational modes based on the size of the input data vector. The disclosed methods provide a compact, fast, and efficient vector comparator mechanism for autonomously working on varying data sizes by switching between multiple operational modes to use a combination of vector and tree reductions to reduce the search set to find the max/min number while a parallel index generation unit keeps track of information that enables the calculation of the final winning index.

Once the method starts at step 901, vector comparator registers and multiplexer selection control signals are initialized at step 905 to perform the peak detection operations, whether for detecting a maximum value or minimum value from an input data vector. For example, the programmable multi-bit comparison output registers C[0:127] may be initialized with a predetermined minimum value when the vector comparator is configured to find the maximum value from the input data vector. Alternatively, the programmable multi-bit comparison output registers C[0:127] may be initialized with a predetermined maximum value when the vector comparator is configured to find the minimum value from the input data vector. In the initialization step 905, the VCU may be initialized by setting the input data vector size parameter N to the size of the vector being processed, and the selection control signals for the first multiplexer 261 (A MUX) and second multiplexer 262 (B MUX) may be set for the page mode of operation. In addition, the IGU may be initialized by storing a zero value in the page state register 271, and by initializing the plurality of multi-bit element index values $[e_{63}:e_0]$ in the element index register 710 (EL_IND_REG) with an initial value $e_i=2i$.

At step 910, the vector comparator method autonomously determines whether to enter or bypass the page mode by determining whether the number of elements N in the input data vector exceeds the number of comparator elements (e.g., N>128). If the number of elements N is less than or equal to the number of comparator element (e.g. N≤128), the vector comparator method runs in the page mode for one cycle to load the data vector into the comparator unit as the candidate search set at step 913. However, if N>128 (affirmative outcome to decision step 910), the vector comparator method performs step 915 to run a page comparison mode and generate a corresponding page index over the course of K iterations to generate the candidate search set. In this mode, the VCU sequentially compares each page of the input data vector over N/128 comparison cycles to generate a candidate search set of the comparison winners from all pages of the input data vector. The resulting candidate search set stores the winner for each element position in the multi-bit comparison output registers C[0:127]. Stated another way, the output register C[i] from the VCU stores the min/max value from element i in each input data vector page. To track the index of the winning value, the IGU generates page index values for each element position in the multi-bit comparison output registers by using the flag/sign bit s[i] from the VCU in conjunction with the state machine. For example, the flag/sign bit s[i] may be fed to the page mode index circuit in the IGU to selectively control updates to a page index register with current page state values.

Upon entering the element comparison mode (step 920), the vector comparator switches to perform a leaf/tree search of the contending candidate search set over one or more comparison cycles. Each iteration in element comparison mode moves the max/min right towards the least significant location in the multi-bit comparison output registers C[0:127]. The number of comparison iterations in the element comparison mode will depend on the number of elements N in the input data vector. If N>128, the VCU performs 7 element comparison cycles once the page comparison mode step 915 is complete. However, if N≤128, the VCU performs log2(N)+1 element comparison cycles to guarantee that the max/min value of the lower M elements is at the right-most location. To track the index of the winning value, the IGU may process element index values in an element index register for the winning candidate as it shifts through the multi-bit comparison output registers during the leaf/tree search. For example, during the first cycle of the element mode, the flag/sign bit s[i] from a first adjacent element comparison by the VCU may be fed to the element mode index circuit [$e_{63}$: $e_0$] in the IGU by writing the flag/sign bit s[i] to the least significant bit (LSB) position of the respective element index values[$e_i$] in the element index register 275. This operation effectively identifies which of the adjacent elements won the first element comparison by the VCU. During the next log2(N) element comparison cycles, each iteration of the element comparison moves the element index value corresponding to the max/min value towards the least significant location of the element index register 275.

Upon completion of element comparison mode step, the index generation unit returns the absolute index of the winning candidate (FINAL_INDEX). The absolute index may be constructed by retrieving the element index value from the least significant bit in the element index register (EL_IND_REG[0]) which contains the element index position for the winning value. The retrieved element index value is then used to retrieve the page index value from the page index register (PG_IND_REG) which is then shifted to the left spaces (or multiplied by 128) and added to the retrieved element index value (EL_IND_REG[0]). In other words, the absolute index for the winning candidate from the input data vector is FINAL_INDEX=PG_IND_REG[EL_IND_REG[0]]*128+ EL_IND_REG[0].

As will be appreciated, the programmable vector comparator mechanism, system and methodology described herein efficiently and quickly find peak values in a set of real or complex numbers provided in an input data vector. In selected embodiments, the vector comparator unit uses a 128 element comparator and a parallel index generation unit to find the maximum or minimum values (and associated index values) from a variable size set of numbers. However, other VCU configurations can be used, such as 64 or 256 element comparators. And while the programmable vector comparator mechanism may be embodied in hardware with VCU and IGU stages arranged to find an absolute index of the peak value from a programmably sized set of numbers, selected aspects of the programmable vector comparator mechanism may be programmed or loaded by processing circuitry (e.g., a processor or controller) executing software (e.g., including but not limited to firmware, resident software, microcode, etc.). Any such programming operation may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD. Thus, some of the disclosed embodiments, as applicable, may be implemented using a variety of different information processing systems. For example, although FIGS. 2a-b depict an exemplary signal processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

By now it should be appreciated that there has been provided a programmable vector comparator hardware unit, system and associated method of operation for finding a peak value in a plurality of input numbers. As disclosed, the programmable vector comparator hardware unit includes an N-element comparator for evaluating a plurality of up to M input numbers (where M>N) by performing tree reductions on a candidate set of winning numbers to find the peak value in the candidate set of winning numbers. The programmable vector comparator hardware unit may also include a memory storage device for storing the plurality of up to M input numbers as an input data vector. In operation, the N-element comparator may compare in parallel a first page of reference numbers (e.g., a minimum or maximum reference value) to successive N-element pages of the plurality of up to M numbers in a page comparison mode to generate the candidate set of winning numbers which contains the peak value. This operation may be supported by selected embodiments wherein the N-element comparator includes a plurality of N multi-bit comparator circuits for generating an N/2 element comparison output from first and second comparison inputs; a first multiplexer circuit for generating the first comparison input from successive N-element pages of the plurality of up to M numbers during a page comparison mode; and a second multiplexer circuit for generating the second comparison input from the N-element comparison output during the page comparison mode. In these embodiments, the first and second multiplexer circuits may also generate the first and second comparison inputs from odd and even indexed elements in the N-element comparison output, respectively, during an element comparison mode where the plurality of N multi-bit comparator circuits generate an N/2 element comparison output from first and second comparison inputs. In other embodiments, the N-element comparator may include a plurality of N multi-bit comparator circuits for generating an N-element comparison output from first and second comparison inputs; an N-element comparator output register coupled to receive the N-element comparison output and to store the candidate set of winning numbers; and first and second multiplexer circuits for generating the first and second comparison inputs from even and odd indexed elements in the N-element comparison output, respectively, during an element comparison mode, thereby enabling the N-element comparator to perform tree reductions on the candidate set of winning numbers to find the peak value in the candidate set of winning numbers. In selected example embodiments, the N-element comparator may be formed with a 128-element comparator for evaluating a plurality of D numbers, where D is selected from {2, 4, 8, 16, 32, 64, 128*I} and where I is a positive integer. The programmable vector comparator hardware unit also includes an index generator stage for processing index values corresponding to the plurality of up to M input numbers to generate an absolute index value for the peak value. In operation, the index generator stage processes the index values using select bits generated at each comparison iteration of the N-element comparator to generate the absolute index value for the peak value. In selected embodiments, the index generator unit may respond to an instruction call to return the absolute index value in T+L cycles, where L is a loading latency cycle count, and where T=(D/128)+7 when D>128, and where T=1+log2 (D) when D≤128. During the page comparison mode, the index generator stage uses a page mode index circuit to store page count values in an N-element page index register such that each element in the page index register stores a page count value identifying which page from the plurality of up to M numbers has a minimum or maximum value for that element. In addition, the index generator stage uses an element mode index circuit to store element index values in an element index register to keep track of the peak value while tree reductions are performed on the candidate set of winning numbers. In selected example applications, the comparator may be implemented in a communication circuit, where the plurality of up to M numbers represent a plurality of waveform signal samples that are processed by the N-element comparator and index generator stage to identify the peak value and corresponding absolute index value representing a localized waveform peak in the plurality of waveform signal samples.

In another form, there is provided a programmable hardware circuit, system and associated method of operation for determining a maximum or minimum from an input number set in an electronic system. In the disclosed circuit, system, and method, initialization values are programmed into one or more registers in a comparator apparatus having an N-element comparator, where the initialization values find either a maximum or minimum from an input number set of up to M numbers, where M is greater than N. In selected embodiments, the initialization occurs by storing a minimum N-element reference value at an output register of the N-element comparator when evaluating the input number set to find the maximum from the input number set. Alternatively, a maximum N-element reference value may be stored at the output register of the N-element comparator when evaluating the input number set to find the minimum from the input number set. Based on the initialized values, the input number set is evaluated with the N-element comparator over a plurality of clock cycles by performing tree reductions on a candidate set of input numbers to find the maximum or minimum in the candidate set of winning numbers while simultaneously processing index values corresponding to the candidate set of input numbers to generate a final index value for the maximum or minimum from the set of input numbers. During a page comparison mode, the input number set is evaluated by comparing in parallel the N-element reference value to one or more N-element pages of numbers from the input data set over K comparison cycles to generate an N-element candidate set of input numbers which contains the maximum or minimum from the input data set. In particular, first and second N-element comparison inputs are loaded for input to the N-element comparator during the page comparison mode, where the first N-element comparison input is fed back from the output register of the N-element comparator, and where the second N-element comparison input is fed in sequence the one or more N-element pages of numbers from the input data. Simultaneously during the page comparison mode, the index generation unit may track over K comparison cycles which of the one or more N-element pages includes the maximum or minimum value for each element in the N-element candidate set of input numbers. This tracking operation may be performed by storing page count values in an N-element page index register over K comparison cycles of the page comparison mode such that each element in the N-element page index register stores a page count value identifying which of the one or more N-element pages has a minimum or maximum value for that element. In a subsequent element comparison mode, tree reduction operations may be performed at the N-element comparator by comparing adjacent numbers from the N-element candidate set of input numbers over log2(N)+1 comparison cycles to find the maximum or minimum in the N-element candidate set of input numbers. For example, tree reduction processing may be performed by comparing adjacent numbers from an N-element candidate set of input numbers over log2(N)+1 comparison cycles to shift the maximum or minimum in the N-element candidate set of input numbers to a right-most location of an output register at the N-element comparator. Simultaneously, index values corresponding to the N-element candidate set of input numbers may be processed by using an element index register to track winning index values resulting from comparing adjacent numbers from the N-element candidate set of input numbers to thereby shift the index value for the maximum or minimum in the N-element candidate set of input numbers to a right-most location of the element index register. In this way, the final index value may be computed from the winning index value stored in the right-most location of the element index register output register and from the corresponding page count value stored in the N-element page index register. In selected example applications, the method may be implemented in a communication circuit, where the input number set of up to M numbers represent a plurality of waveform signal samples that are processed by the to identify the maximum or minimum in the candidate set of winning numbers and corresponding final index value representing a localized waveform peak in the plurality of waveform signal samples.

In yet another form, there is provided an N-element vector comparator circuit for finding a peak number from an input vector $\underline{x}=(x_0, x_1, \ldots x_M)$. As disclosed, the N-element vector comparator circuit includes a vector register array storage device for storing an input data vector $\underline{x}=(x_0, x_1, \ldots x_M)$ of up to M numbers. The N-element vector comparator circuit also includes a comparator circuit for generating a candidate set of winning numbers from the input data vector $\underline{x}$ during a page comparison mode and for performing tree reductions on the candidate set of winning numbers to find the peak value during an element comparison mode. The disclosed comparator circuit includes a plurality of N multi-bit comparator circuits, along with first and second multiplexer circuits. The plurality of N multi-bit comparator circuits generates an N-element comparison output and N select signal outputs from first and second comparison inputs. The first multiplexer circuit generates the first comparison input from successive N-element pages of the input data vector $\underline{x}=(x_0, x_1, \ldots x_M)$ during a page comparison mode, and generates the first comparison input from odd-indexed elements of the N-element comparison output during an element comparison mode. The second multiplexer circuit generates the second comparison input from the N-element comparison output during the page comparison mode, and generates the second comparison input from even-indexed elements of the N-element comparison output during an element comparison mode. Finally, the N-element vector comparator circuit includes an index generator circuit for processing the N select signal outputs using control logic to track indices for each number in the input data vector $\underline{x}=(x_0, x_1, \ldots x_M)$. To this end, the index generator circuit includes a page mode index circuit and an element mode index circuit. The page mode index circuit stores page count values in an N-element page index register under control of the N select signal outputs during the page comparison mode such that each element in the page index register stores a page count value identifying which page from the input data vector $\underline{x}=(x_0, x_1, \ldots x_M)$ has a minimum or maximum value for that element. The element mode index circuit stores element index values in an element index register under control of the N select signal outputs during the element comparison mode to keep track of the element index value for the peak value in the candidate set of winning numbers while tree reductions are performed on the candidate set of winning numbers.

Although the described exemplary embodiments disclosed herein are directed to hardware-based methods and systems for efficiently finding peak values from different sized input data vectors, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A comparator for finding a peak value, comprising:
   an N-element comparator for evaluating a plurality of up to M numbers by performing tree reductions on a candidate set of winning numbers to find the peak value in the candidate set of winning numbers, where M is greater than N; and
   an index generator stage for processing index values corresponding to the plurality of up to M numbers to generate an absolute index value for the peak value.

2. The comparator of claim 1, further comprising a memory storage device for storing the plurality of up to M numbers as an input data vector.

3. The comparator of claim 1, where the N-element comparator compares in parallel a first page of reference numbers to successive N-element pages of the plurality of up to M numbers in a page comparison mode to generate the candidate set of winning numbers which contains the peak value.

4. The comparator of claim 3, where the index generator stage comprises a page mode index circuit for storing page count values in an N-element page index register during the page comparison mode such that each element in the page index register stores a page count value identifying which page from the plurality of up to M numbers has a minimum or maximum value for that element.

5. The comparator of claim 1, where the N-element comparator comprises:
   a plurality of N multi-bit comparator circuits for generating an N-element comparison output from first and second comparison inputs;

a first multiplexer circuit for generating the first comparison input from successive N-element pages of the plurality of up to M numbers during a page comparison mode; and a second multiplexer circuit for generating the second comparison input from the N-element comparison output during the page comparison mode.

6. The comparator of claim 5, where the first and second multiplexer circuits generate the first and second comparison inputs from odd and even indexed elements in the N-element comparison output, respectively, during an element comparison mode where the plurality of N multi-bit comparator circuits generate an N/2 element comparison output from first and second comparison inputs.

7. The comparator of claim 1, where the N-element comparator comprises:
a plurality of N multi-bit comparator circuits for generating an N/2 element comparison output from first and second comparison inputs;
an N-element comparator output register coupled to receive the N-element comparison output and to store the candidate set of winning numbers; and
first and second multiplexer circuits for generating the first and second comparison inputs from even and odd indexed elements in the N-element comparison output, respectively, during an element comparison mode, thereby enabling the N-element comparator to perform tree reductions on the candidate set of winning numbers to find the peak value in the candidate set of winning numbers.

8. The comparator of claim 1, where the N-element comparator comprises a 128-element comparator for evaluating a plurality of D numbers, where D is selected from {2, 4, 8, 16, 32, 64, 128*I} and where I is a positive integer.

9. The comparator of claim 8, where the index generator unit responds to an instruction call to return the absolute index value in T +L cycles, where L is a loading latency cycle count, and where T =(D/128) +7 when D >128, and where T =1 +log2(D) when D <128.

10. The comparator of claim 1, where the index generator stage processes the index values using select bits generated at each comparison iteration of the N-element comparator to generate the absolute index value for the peak value.

11. The comparator of claim 1, where the index generator stage comprises an element mode index circuit for storing element index values in an element index register to keep track of the peak value while tree reductions are performed on the candidate set of winning numbers.

12. The comparator of claim 1 implemented in a communication circuit, where the plurality of up to M numbers comprise a plurality of waveform signal samples that are processed by the N-element comparator and index generator stage to identify the peak value and corresponding absolute index value representing a localized waveform peak in the plurality of waveform signal samples.

13. A method for determining a maximum or minimum from an input number set in an electronic system, comprising:
initializing one or more registers in a comparator apparatus comprising an N-element comparator to find either a maximum or minimum from an input number set of up to M numbers, where M >N; and
evaluating the input number set with the N-element comparator over a plurality of clock cycles by performing tree reductions on a candidate set of input numbers to find the maximum or minimum in the candidate set of winning numbers while simultaneously processing index values corresponding to the candidate set of input numbers to generate a final index value for the maximum or minimum from the set of input numbers.

14. The method of claim 13, where initializing one or more registers comprises:
storing a minimum N-element reference value at an output register of the N-element comparator when evaluating the input number set to find the maximum from the input number set, or
storing a maximum N-element reference value at the output register of the N-element comparator when evaluating the input number set to find the minimum from the input number set.

15. The method of claim 14, where evaluating the input number set further comprises comparing in parallel the N-element reference value to one or more N-element pages of numbers from the input data set over K comparison cycles of a page comparison mode to generate an N-element candidate set of input numbers which contains the maximum or minimum from the input data set by loading first and second N-element comparison inputs to the N-element comparator, where the first N-element comparison input is fed back from the output register of the N-element comparator, and where the second N-element comparison input is fed in sequence the one or more N-element pages of numbers from the input data.

16. The method of claim 15, where performing tree reductions comprises comparing adjacent numbers from the N-element candidate set of input numbers over log2(N) +1 comparison cycles of an element comparison mode to find the maximum or minimum in the N-element candidate set of input numbers.

17. The method of claim 15, further comprising tracking over K comparison cycles of the page comparison mode which of the one or more N-element pages includes the maximum or minimum value for each element in the N-element candidate set of input numbers.

18. The method of claim 15, further comprising storing page count values in an N-element page index register over K comparison cycles of the page comparison mode such that each element in the N-element page index register stores a page count value identifying which of the one or more N-element pages has a minimum or maximum value for that element.

19. The method of claim 18, where performing tree reductions comprises comparing adjacent numbers from an N-element candidate set of input numbers over log2(N) +1 comparison cycles to shift the maximum or minimum in the N-element candidate set of input numbers to a right-most location of an output register at the N-element comparator, and where simultaneously processing index values comprises processing index values corresponding to the N-element candidate set of input numbers by using an element index register to track winning index values resulting from comparing adjacent numbers from the N-element candidate set of input numbers to thereby shift the index value for the maximum or minimum in the N-element candidate set of input numbers to a right-most location of the element index register.

20. The method of claim 19, where evaluating the input number set to generate the final index value comprises computing the final index value from the winning index value stored in the right-most location of the element index register output register and from the corresponding page count value stored in the N-element page index register.

21. The method of claim 19, where the method for determining a maximum or minimum from an input number set is implemented in a communication circuit, where the input number set of up to M numbers comprise a plurality of waveform signal samples that are processed to identify the maximum or minimum in the candidate set of winning numbers and corresponding final index value representing a localized waveform peak in the plurality of waveform signal samples.

22. An N-element vector comparator circuit for finding a peak number, comprising:
- a vector register array storage device for storing an input data vector $x = (x_o, x_1, \ldots x_M)$ of up to M numbers, where M is greater than N;
- a comparator circuit for generating a candidate set of winning numbers from the input data vector x during a page comparison mode and for performing tree reductions on the candidate set of winning numbers to find the peak value during an element comparison mode, where the comparator circuit comprises:
- a plurality of N multi-bit comparator circuits for generating an N-element comparison output and N select signal outputs from first and second comparison inputs,
- a first multiplexer circuit for generating the first comparison input from successive N-element pages of the input data vector $x = (x_o, x_1, \ldots x_M)$ during a page comparison mode, and for generating the first comparison input from odd-indexed elements of the N-element comparison output during an element comparison mode, and
  - a second multiplexer circuit for generating the second comparison input from the N-element comparison output during the page comparison mode, and for generating the second comparison input from even-indexed elements of the N-element comparison output during an element comparison mode; and
- an index generator circuit for processing the N select signal outputs using control logic to track indices for each number in the input data vector $x = (x_o, x_1, \ldots x_M)$, where the index generator circuit comprises:
- a page mode index circuit for storing page count values in an N-element page index register under control of the N select signal outputs during the page comparison mode such that each element in the page index register stores a page count value identifying which page from the input data vector $x = (x_o, x_1, \ldots x_M)$ has a minimum or maximum value for that element, and
- an element mode index circuit for storing element index values in an element index register under control of the N select signal outputs during the element comparison mode to keep track of the element index value for the peak value in the candidate set of winning numbers while tree reductions are performed on the candidate set of winning numbers.

* * * * *